United States Patent
Bramley

(10) Patent No.: US 11,163,885 B2
(45) Date of Patent: Nov. 2, 2021

(54) FIRMWARE OUTPUTTED KEYBOARD CODE TO ENTER OPERATING SYSTEM STATE

(71) Applicant: Hewlett-Packard Development Company, L.P., Spring, TX (US)

(72) Inventor: Richard A Bramley, Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 107 days.

(21) Appl. No.: 16/603,274

(22) PCT Filed: Apr. 21, 2017

(86) PCT No.: PCT/US2017/028896
§ 371 (c)(1),
(2) Date: Oct. 7, 2019

(87) PCT Pub. No.: WO2018/194667
PCT Pub. Date: Oct. 25, 2018

(65) Prior Publication Data
US 2021/0103660 A1    Apr. 8, 2021

(51) Int. Cl.
| | | |
|---|---|---|
| *G06F 11/30* | (2006.01) | |
| *G06F 11/22* | (2006.01) | |
| *G06F 21/50* | (2013.01) | |
| *G06F 21/57* | (2013.01) | |
| *G06F 21/83* | (2013.01) | |
| *G06F 11/07* | (2006.01) | |

(52) U.S. Cl.
CPC .......... *G06F 21/572* (2013.01); *G06F 21/575* (2013.01); *G06F 21/83* (2013.01); *G06F 2221/033* (2013.01)

(58) Field of Classification Search
CPC ...... G06F 21/572; G06F 21/575; G06F 21/83; G06F 2221/033; G06F 11/0793; G06F 11/0751; G06F 11/0766; G06F 11/0771; G06F 9/4401
See application file for complete search history.

(56) References Cited

U.S. PATENT DOCUMENTS

| | | | | |
|---|---|---|---|---|
| 4,780,755 A | * | 10/1988 | Knierim | G01R 35/002 324/121 R |
| 5,173,940 A | | 12/1992 | Lantz et al. | |
| 5,564,054 A | * | 10/1996 | Bramnick | G06F 9/4411 713/2 |

(Continued)

OTHER PUBLICATIONS

Krishna, Vamsi. "How to Disable the Lock Screen Shortcut Key (Win + L) in Windows", <https://www.maketecheasier.com/disable-lock-screen-shortcut-key-windows>. 2015. (Year: 2015).*

(Continued)

*Primary Examiner* — Michael Simitoski
(74) *Attorney, Agent, or Firm* — Perry + Currier Inc.

(57) ABSTRACT

A computer system is monitored by firmware for a non-conforming state. Upon detecting the non-conforming state, firmware of the computer system outputs a keyboard code that causes an operating system to enter a predetermined state, such as a lock screen or other quiescent display state. A human-perceptible message is displayed at a display device after outputting the keyboard code.

12 Claims, 9 Drawing Sheets

(56) References Cited

U.S. PATENT DOCUMENTS

| | | | |
|---|---|---|---|
| 5,757,356 A | | 5/1998 | Takasaki et al. |
| 5,978,922 A | | 11/1999 | Arai et al. |
| 6,035,420 A | * | 3/2000 | Liu .................. G06F 11/2284 714/25 |
| 6,587,966 B1 | | 7/2003 | Chaiken et al. |
| 6,792,561 B1 | | 9/2004 | Mamata |
| 7,477,205 B1 | * | 1/2009 | de Waal .............. G06F 3/1431 345/1.1 |
| 7,623,133 B1 | * | 11/2009 | de Waal .............. G06F 3/1431 345/506 |
| 7,987,512 B2 | | 7/2011 | Venkatachalam et al. |
| 8,943,373 B1 | * | 1/2015 | Angaluri .............. G06F 11/162 714/57 |
| 10,776,193 B1 | | 9/2020 | Karpagavinayagam ................ G06F 11/1441 |
| 10,866,852 B2 | * | 12/2020 | Young ..................... G06F 3/14 |
| 10,922,162 B2 | * | 2/2021 | Puthillathe .......... G06F 11/0775 |
| 2003/0122864 A1 | | 7/2003 | Jenne et al. |
| 2003/0222854 A1 | * | 12/2003 | Yurugi .................. G06F 21/35 345/172 |
| 2004/0123090 A1 | * | 6/2004 | Zimmer ............... G06F 9/4401 713/1 |
| 2004/0215950 A1 | * | 10/2004 | Lindeman ............ G06F 9/4401 713/1 |
| 2005/0144493 A1 | * | 6/2005 | Cromer ................ G06F 9/4401 713/310 |
| 2005/0151671 A1 | * | 7/2005 | Bortolotto ............. G08G 1/054 340/936 |
| 2007/0013693 A1 | * | 1/2007 | Hedrick ............... G01C 23/005 345/419 |
| 2007/0168763 A1 | * | 7/2007 | Sauber ................. G06F 11/327 714/57 |
| 2008/0077973 A1 | * | 3/2008 | Zimmer ................ G06F 21/53 726/2 |
| 2008/0120716 A1 | * | 5/2008 | Hall ..................... G06F 21/554 726/16 |
| 2008/0125878 A1 | | 5/2008 | Doyle et al. |
| 2008/0256400 A1 | | 10/2008 | Yang et al. |
| 2009/0259739 A1 | * | 10/2009 | Cartes ................ H04L 43/0817 709/223 |
| 2013/0061242 A1 | * | 3/2013 | Lewis .................... G06F 9/545 719/313 |
| 2013/0238684 A1 | | 9/2013 | Patil |
| 2014/0015842 A1 | * | 1/2014 | Sebesta ................. G09G 5/395 345/541 |
| 2014/0040735 A1 | * | 2/2014 | Jung .................... G06F 3/0488 715/708 |
| 2014/0115382 A1 | * | 4/2014 | Sainath ................ G06F 11/073 714/6.11 |
| 2015/0095874 A1 | * | 4/2015 | Tapaninen ........... G06F 9/4486 717/100 |
| 2015/0220736 A1 | * | 8/2015 | Martinez ................ G06F 21/64 711/163 |
| 2015/0261598 A1 | * | 9/2015 | Balasubramanian ................ G06F 11/079 714/10 |
| 2016/0063255 A1 | * | 3/2016 | Jeansonne ............ G06F 21/572 713/2 |
| 2016/0378576 A1 | * | 12/2016 | Jayakumar .............. G06F 9/542 719/312 |
| 2017/0300371 A1 | * | 10/2017 | Soffer ................. G06F 11/3072 |

OTHER PUBLICATIONS

Sakthikumar, Palsamy, and Vincent J. Zimmer. "White Paper A Tour beyond BIOS Implementing the ACPI Platform Error Interface with the Unified Extensible Firmware Interface." Jan. 31, 2013: 27. (Year: 2013).*

Soper, Mark Edward "Fixing Windows Devices That Can't Start", Oct. 29, 2014.

* cited by examiner

FIRMWARE OUTPUTTED KEYBOARD CODE TO ENTER OPERATING SYSTEM STATE

BACKGROUND

Computer firmware stores data that is often used to boot a computer system and launch an operating system.

Firmware may signal problems to the user during a power-on self-test (POST) sequence. The POST may display an error message to the user or sound a beep. However, when a problem occurs while the operating system is running, the user may not be made aware of the problem until the next time the computer system is rebooted and the POST or similar sequence is performed.

DETAILED DESCRIPTION

A computer may be affected by error, malware, or other undesirable state, such as an indication of a low battery or excessive central processing unit (CPU) temperature. The firmware may output a keyboard code that triggers the operating system to enter a state with knowable or identifiable display parameters, such as a lock screen, so that the firmware may reliably output an alert message to the user. This may allow the user to be warned of the problem at runtime, regardless of unpredictable activity that the user may be performing with the operating system, display device, or any applications.

Figure 1:
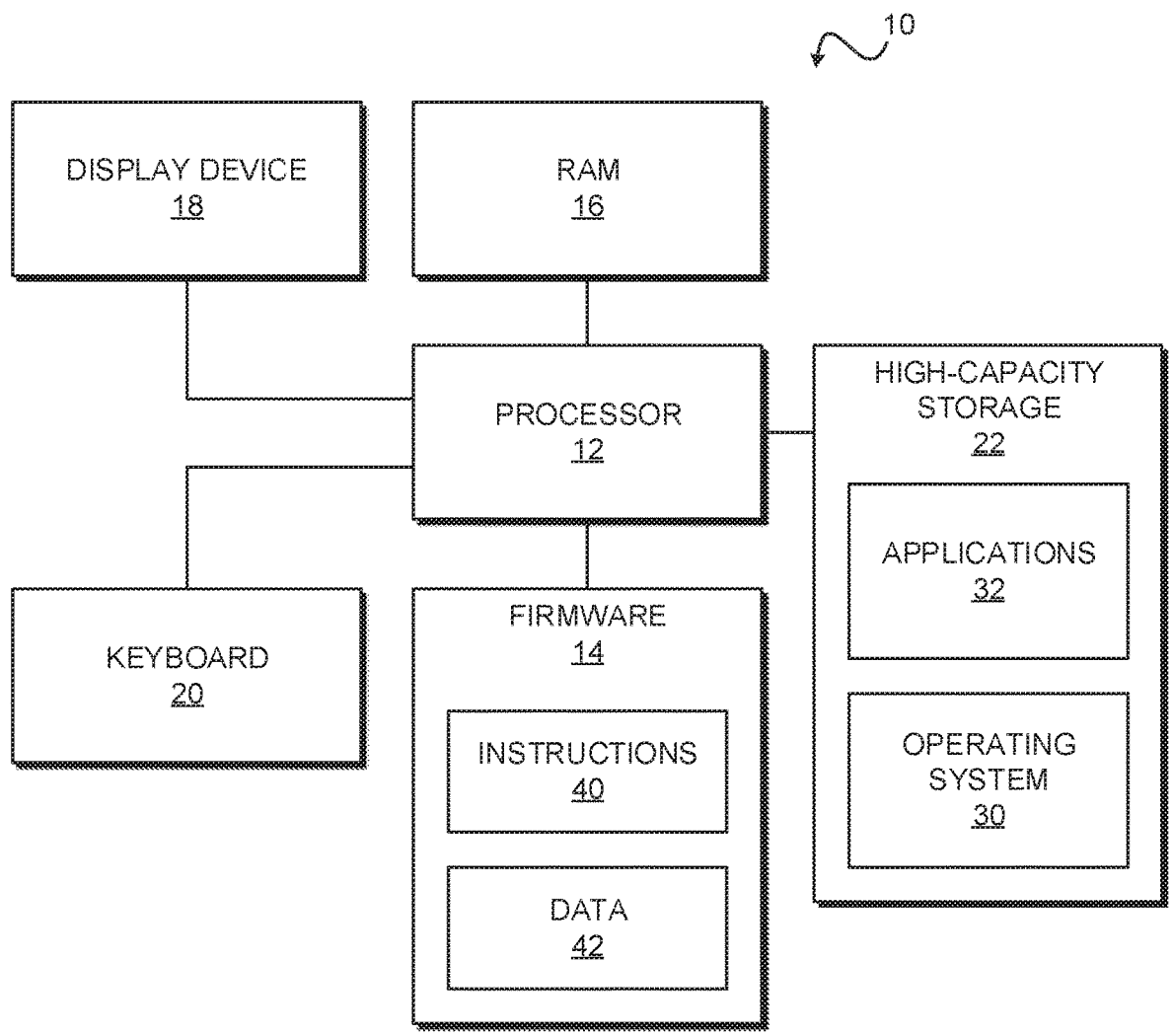
FIG. 1 is a block diagram of an example computer system.

An example computer system 10 is shown in FIG. 1. The computer system 10 may include a processor 12, firmware 14, random-access memory (RAM) 16, a display device 18, a keyboard 20, and high-capacity storage 22.

The processor 12 may include a CPU, a microcontroller, a microprocessor, a processing core, a field-programmable gate array (FPGA), or similar. The processor 12 may execute instructions stored in the firmware 14, RAM 16, and high-capacity storage 22.

The firmware 14 is coupled to the processor 12 and may include a non-transitory machine-readable storage medium that may be any electronic, magnetic, optical, or other physical storage device that stores executable instructions. The firmware 14 may include, for example, electrically-erasable programmable read-only memory (EEPROM), flash memory, or similar.

The RAM 16 is coupled to the processor 12 and may include any electronic, magnetic, optical, or other physical storage device that stores executable instructions. The RAM 16 may include, for example, static RAM, dynamic RAM, or similar.

The display device 18 may include a graphics controller, graphics processor, graphics memory, a monitor, a touchscreen, or similar.

The keyboard 20 may include a keyboard with mechanically actuated keys, a touchscreen, or similar.

The high-capacity storage 22 is coupled to the processor 12 and may include a non-transitory machine-readable storage medium that may be any electronic, magnetic, optical, or other physical storage device that stores executable instructions. The high-capacity storage 22 may include, for example, a hard disk drive, an optical disc drive, a solid-state drive, flash memory, or similar.

The high-capacity storage 22 may store an operating system 30 that is executable by the processor 12 to provide general functionality to the computer system 10, including functionality to support applications. Examples of operating systems include Windows™, macOS™, iOS™, Android™, Linux™, and Unix™. The high-capacity storage 22 may further store applications 32 that are executable by the processor 12 to provide specific functionality to the computer system 10.

The firmware 14 may store a set of instructions 40 and data 42 to provide boot and runtime services to the operating system 30. The instructions 40 may be executable by the processor 12. The firmware 14 may be a Basic Input/Output System (BIOS), Unified Extensible Firmware Interface (UEFI) firmware, or similar.

The operating system 30 may be responsive to a keyboard code to enter a predetermined state, such as a lock screen or other operating system specific screen that is triggerable via the keyboard and brings the display to a quiescent state suitable for alert presentation. The predetermined state may attract the attention of the user, who may be using the operating system 30 or one or more of the applications 32. The predetermined state may limit the functionality provided by the operating system 30. For example, a lock screen may display information, such as date, time, a background image, and similar, while omitting other displayable components of the operating system 30 and the applications 32. Such a lock screen may also limit actions that can be performed by the user. The predetermined state may be any other quiescent state.

The predetermined state may require the user to authenticate themselves in order to return the operating system 30 to a normal operating state. For example, a lock screen may require the user to authenticate themselves to return the display to a desktop graphical user interface (GUI) and to gain access to the normal operating functionality of the operating system 30 and the applications 32. Authentication may include the user providing credentials, such as a username, a password, a fingerprint scan, a facial recognition scan, and similar.

In the Windows™ operating system, a keyboard code to trigger a lock screen may result from the user pressing the Windows logo key and the L key on the keyboard 20 at the same time. This combination of key presses may be termed "Windows+L" and may require that the Windows logo key be held down as the L key is pressed. A Windows logo key may be referred to as a GUI key, particularly when other operating systems are used.

Another example keyboard code that may trigger a predetermined state in the operating system is Control-Alt- Delete, which may be invoked by pressing the Delete key while holding both the Control and Alt keys.

Keyboard codes may be referred to as scan codes or scancodes in some operating systems, such as the Windows™ operating system. In other operating systems, keyboard codes may be referred to by other terminology. Keyboard codes may depend on the type of keyboard. For example, a PS/2 keyboard may use a set of keyboard codes different from a set of keyboard codes used by a Universal Serial Bus (USB) keyboard. In addition, different keyboard codes may be generated when pressing and releasing the same physical key.

A keyboard code may be generated by the keyboard 20 and provided by the processor 12 to the RAM 16 for consumption by the operating system 30. The keyboard code may be communicated from the keyboard 20 to the processor 12 through execution of the firmware 14 and through a keyboard microcontroller or similar. A keyboard code may be translated into another format, any number of times, prior to being provided to the operating system 30. For example, the keyboard 20 may generate a keyboard code according to a first format and provide the keyboard code to the firmware 14, which translates the keyboard code into another format for use by the operating system 30.

Figure 2:
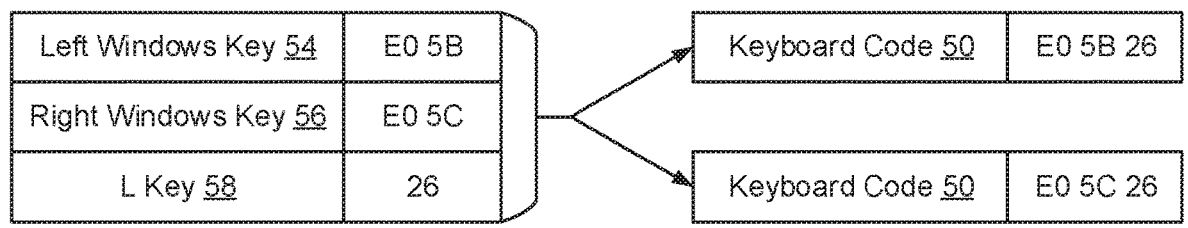
FIG. 2 is a table of example keyboard codes.
Figure 3:
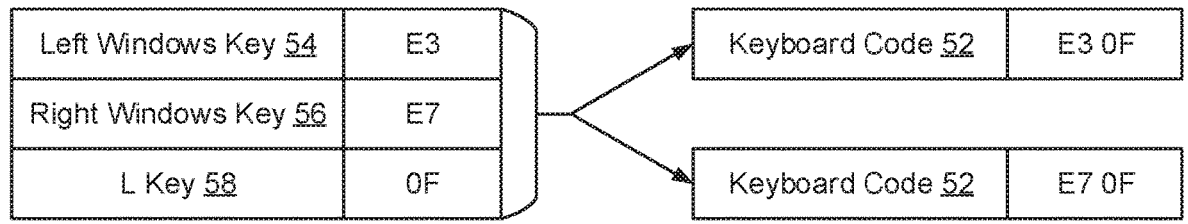
FIG. 3 is a table of other example keyboard codes.

FIG. 2 shows example keyboard codes 50 according to a PS/2 Set 1 (IBM PC XT) format. FIG. 3 shows example keyboard codes 52 according to a USB format. The values shown are in hexadecimal. Keyboards codes may differ for the same logical key when more than one physical key serves the same function. For example, a keyboard may have two Windows logo keys, one on the left side and another on the right side. A keyboard code 50, 52 may be a plurality of sequential keyboard codes such as combinations of a left Windows logo key code 54, a right Windows logo key code 56, and an L key code 58. The keyboard codes 50, 52 are examples of keyboard codes that may cause the operating system 30 to entered the predetermined state, such as a lock screen.

Referring back to FIG. 1, the set of instructions 40 in the firmware 14 may include instructions to monitor for a non-conforming state of the computer system 10 and to output a keyboard code, such as a keyboard code 50, 52 shown in FIG. 2, to the operating system 30, upon detecting the non-conforming state. The non-conforming state may be identified in the instructions 40. A representation of the non-conforming state may be stored as data 42 in the firmware 14. The particular keyboard code to be outputted may also be stored as data 42 in the firmware 14.

Examples of non-conforming state include an error, a malware signature, a battery level, a CPU temperature, and similar. Errors and malware may occur in the firmware 14, in RAM 16, or elsewhere in the computer system 10. With regard to error or malware, the non-conforming state may be represented by a checksum of the instructions 40 and data 42, a cryptographic hash of the instructions 40 and data 42, or similar. The instructions 40 may compute the checksum, hash, or similar and compare such against a value stored as data 42. If the computed value does not match the stored value, then the instructions 40 may output the keyboard code to the operating system 30 to initiate the predetermined state, such as a lock screen, in the operating system 30.

With regard to battery level, CPU temperature, and similar, the non-conforming state may be represented by a value stored in data 42. For example, a minimum allowable battery level may be stored as data 42. The instructions 40 may measure actual battery level and may compare the measured battery level to the minimum allowable battery. If the measured value does not match the stored value, then the instructions 40 may output the keyboard code to the operating system 30 to initiate the predetermined state, such as a lock screen, in the operating system 30.

Non-conforming state may be used to alert the user of a problem with the firmware, a problem with the computer system, or any other information that should be quickly brought to the attention of the user at runtime. Non-conforming state may define an alert condition to alert the user of a problem, a potential problem, or other urgent information.

The predetermined state is a state that may be knowable or identifiable to the firmware 14 and that may attract the attention of the user. For example, a lock screen may interrupt the activity of the user, whether the user is playing a game, working on a document, or performing a similar activity with the computer system 10. The lock screen may also operate under one or more display parameters that the firmware 14 may be able to identify in order to reliably output a human-perceptible message to the user. That is, the computer system 10 may have any kind and quantity of display devices 18 with various capabilities, which may not be known or readily identifiable to the firmware 14. For example, the firmware 14 may store display parameters as data 42. The firmware 14 may store a plurality of display parameters as data 42 that is correlated to a plurality of different kinds of display devices 18 that may be installed. In addition, for a given display device 18, a wide variety of display parameters may be available to and changeable by the operating system 30 and applications 32. As such, the predetermined state may provide a limited set of display parameters that, if not stored by the firmware 14, may be indefinable by the firmware 14.

Examples of display parameters include framebuffer base address, resolution, scan line length, and color depth. Obtaining several or all of these parameters may be required to reliably output a human-perceptible message.

The set of instructions 40 in the firmware 14 may include instructions to output a human-perceptible message for display at the display device 18 after outputting the keyboard code to trigger the predetermined state, such as a lock screen, in the operating system 30. The human-perceptible message may be an alert, warning, or similar message that indicates to the user the non-conforming state of the computer system 10. For example, the human-perceptible message may include an error message, such as "An error has been detected in the system." In another example, the human-perceptible message may include a value determined by the firmware 14, such as "Your system's battery level is below 1%."

The non-conforming state can therefore be brought to the attention of the user during runtime, irrespective of what the user may happen to be doing with the computer system 10 and irrespective of current display parameters of the display device 18. A POST sequence is not required to inform the user of a problem in the firmware 14.

Figure 4:
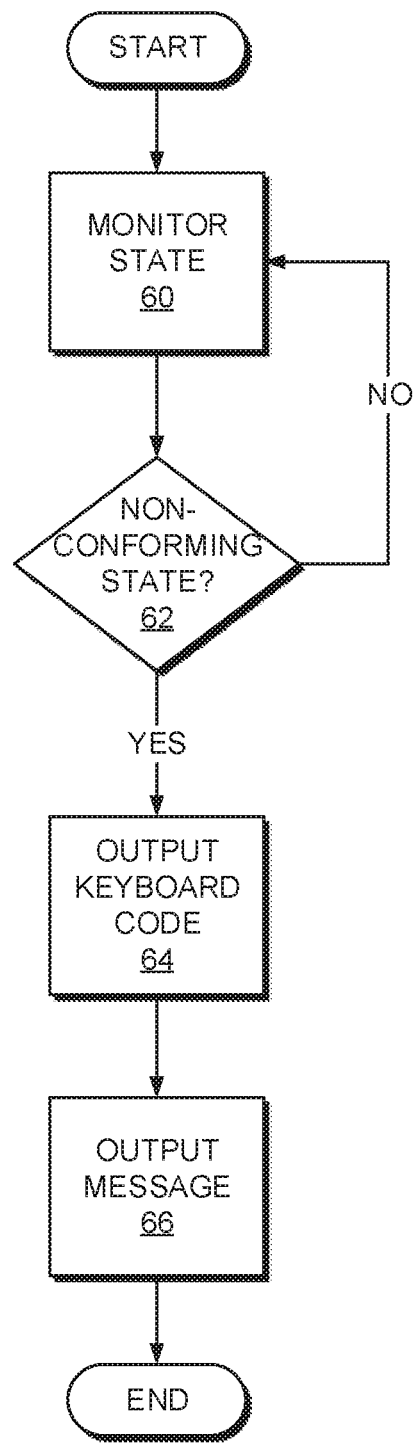
FIG. 4 is a flowchart of an example method of using firmware to display a human-perceptible message while an operating system is running.

FIG. 4 shows a flowchart of an example method of using firmware to display a human-perceptible message while an operating system is running. The method may be realized with the set of instructions 40, for example.

A state of a computer system may be monitored, at block 60, during operation of an operating system of the computer system. State may be monitored by detecting an error in the computer system, such as in the firmware, comparing a value measured by the firmware to a value stored by the firmware, or similar. During block 60, the user's attention may be directed to the operating system or an application run by the operating system and display parameters may be unknown or unidentifiable by the firmware.

Monitored state may be compared to an alert condition, at block 62. An alert condition may include an error in the computer system, an error in the firmware, a measured value that fails to conform to a stored value, or similar.

Upon detecting the alert condition, the firmware may output a keyboard code, at block 64. The keyboard code may be selected to cause the operating system to enter a predetermined state, such as a state that has one or more display parameters that are stored or identifiable by the firmware. Switching to the predetermined state may also attract the user's attention. A lock screen is an example of such a predetermined state. The predetermined state may temporarily restrict activities that may be performed by the user.

Stored display parameters may result from, for example, the firmware being programmed with information about a display device. That is, the firmware may store display parameters as data. For example, in a laptop computer, the firmware may be provided with information about the graphics controller, screen, and similar. For a model run of laptop computers there may be several options for display devices, such as graphics controller, screens, and the like. As such, the firmware may store a plurality of display parameters as data correlated to a plurality of display devices that may be installed. Display parameters may then be looked up by the firmware depending on the actual display devices installed.

Identifiable display parameters may be those that, for example, can be discerned from analyzing display data, such as data in a framebuffer associated with the display device. A desktop computer, for example, may have a graphics card that is replaced from time to time, and display parameters of the graphics card may be identifiable by analyzing data in the framebuffer.

After outputting the keyboard code, the firmware may output a human-perceptible message for display at a display device, at block 66. The human-perceptible message may include information for the user as to the reason that the message is being display. For example, the human-perceptible message may indicate the alert condition. As the firmware may now consider the operating system to be in the predetermined state, the firmware may know or be able to identify one or more display parameters for reliably displaying the human-perceptible message.

Figure 5:
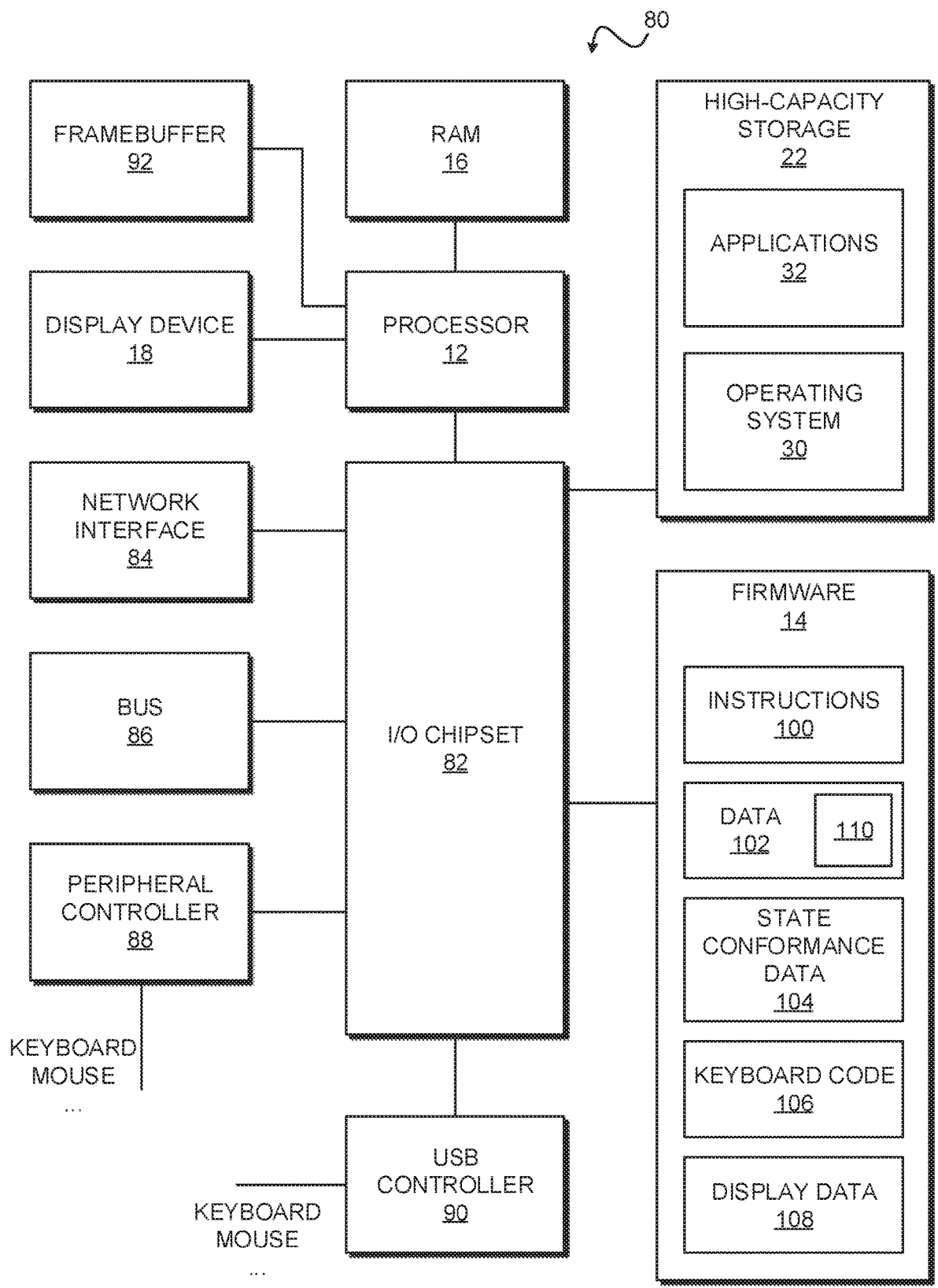
FIG. 5 is a block diagram of another example computer system.

Another example computer system 80 is shown in FIG. 5. The computer system 80 may include a processor 12, firmware 14, RAM 16, a display device 18, and high-capacity storage 22 for storing an operating system 30 and applications 32, as described elsewhere herein. The RAM 16 and display device 18 may be coupled to the processor 12.

The computer system 80 may include an input/output chipset 82 coupled to the processor 12 for managing data flow to and from the processor 12. The chipset 82 may include a northbridge, southbridge, or similar. The high-capacity storage 22 and firmware 14 may be coupled to the processor 12 through the chipset 82.

The computer system 80 may include a network interface 84, a bus 86, a peripheral controller 88, and a USB controller 90, which may be coupled to the processor 12 via the chipset 82. The network interface 84 may include an Ethernet interface, a wireless interface, or similar. The bus 86 may provide connections to components that may be used to add functionality to the computer system 80. The bus 86 may be a Peripheral Component Interconnect Express (PCIe) bus or similar.

The peripheral controller 88 is to control peripheral devices such as a keyboard, mouse, and similar. The peripheral controller 88 may include an embedded controller, a Super I/O controller, or similar. The peripheral devices connected to the peripheral controller 88 may be, for example, a PS/2 keyboard, a PS/2 mouse, and similar.

The USB controller 90 is to control peripheral devices, such as a keyboard, mouse, and similar, which operate according to a USB protocol.

The computer system 80 may include a framebuffer 92 for storing images for display at the display device 18. The framebuffer 92 is to store pixel color values. The framebuffer 92 may be a portion of the RAM 16, may be memory of the display device 18, or similar.

The firmware 14 may store a set of instructions 100 and data 102 to provide boot and runtime services to the operating system 30. The instructions 100 may be executable by the processor 12. The firmware 14 may be a BIOS, UEFI firmware, or similar.

The firmware 14 may store state conformance data 104, a keyboard code 106, and display data 108.

State conformance data 104 may include error detection information, one or more values for comparing to measured values, or similar. Error detection information may include a checksum, hash, or similar that may be precomputed based on a conforming state of the firmware 14. During operation of the firmware 14, the instructions 100 may compute the error detection information and test such against what is stored to determine whether the firmware 14 contains an error. Stored values may be used to compare to measured values, such as CPU temperature, battery level, or similar. If the firmware state does not match the state conformance data 104, then a non-conforming state may be determined.

The keyboard code 106 may be a keyboard code that the set of instructions 100 outputs to trigger the operating system 30 to enter a predetermined state, such as a lock screen, as described elsewhere herein. Examples of keyboard codes 50, 52 are shown in FIGS. 2 and 3.

Figure 10:
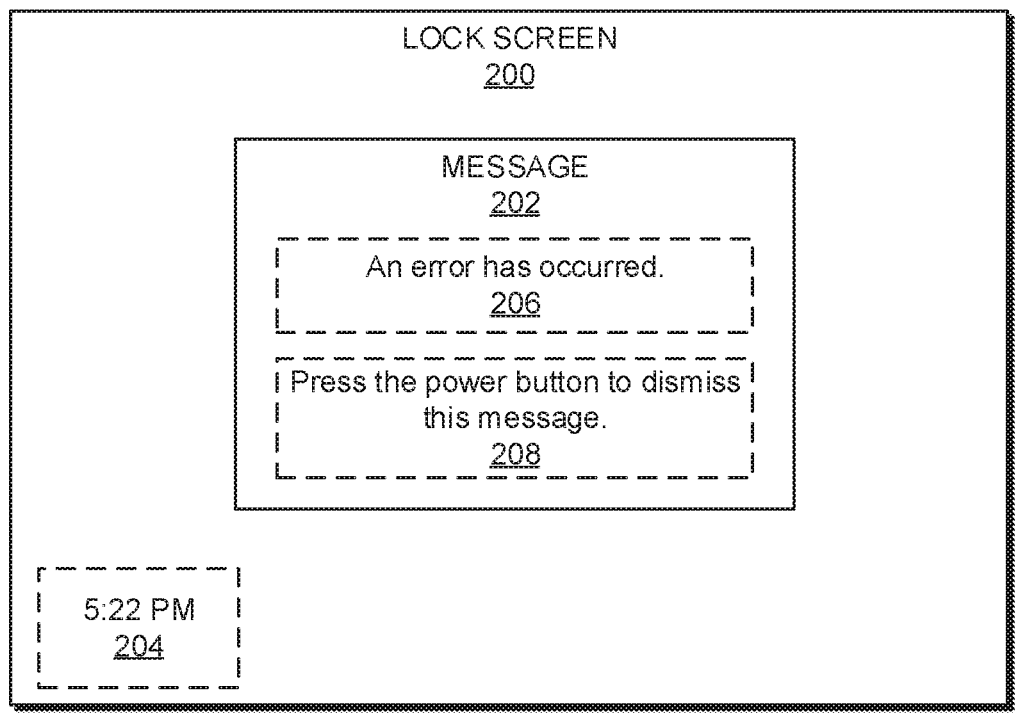
FIG. 10 is a diagram of an example user interface of a lock screen and a human-perceptible message.

The display data 108 may define a human-perceptible message that the set of instructions 100 causes to be displayed at the display device 18. The display data 108 may define a graphical element, a textual element, a variable element, a human-interface element, and similar. Example graphical elements includes a window, a frame, and the like. Example textual elements include message text, such as "A firmware error has occurred." Example variable elements include variables for values, such as battery level, CPU temperature, and similar. Example human-interface elements include instructions or buttons to dismiss the human-perceptible message. An example human-perceptible message is shown in FIG. 10.

The set of instructions 100 may output the human-perceptible message as defined by the display data 108 to the framebuffer 92. This may be realized by using a System Management Mode (SMM), if the computer system is of an x86 or similar architecture, or by using a similar high-privilege mode. For example, the instructions 100 may trigger a System Management Interrupt (SMI) to enter the SMM when the non-conforming state of the computer system 80 is detected and then may output the display data 108 to the framebuffer 92.

The instructions 100 may identify one or more display parameters in order to reliably display the human-perceptible message. The instructions 100 may analyze data in the framebuffer 92 to determine resolution, scan line length, and color depth. The instructions 100 may then apply one or more identified display parameters when outputting display data 108 to write display data 108 to a proper location in the framebuffer 92. Outputting display data 108 may include selecting specific display data 108 from a set of display data, according to the determined display parameters. That is, a plurality of human-perceptible messages may be preconfigured for different display parameters, and the instructions may select a human-perceptible message based on identified display parameters. Outputting display data 108 may include modifying display data 108 to accord to identified display parameters. This may be achieved by performing scaling, color filtering, and similar.

Display parameters 110 may be stored as data 102 in the firmware 14. Display parameters 110 may be stored as correlated to various display devices, such as graphics controllers and screens, that may be installed at the computer system 80. The instructions 100 may identify a connected display device and use display device identifier to look up one or more suitable display parameter.

Figure 6:
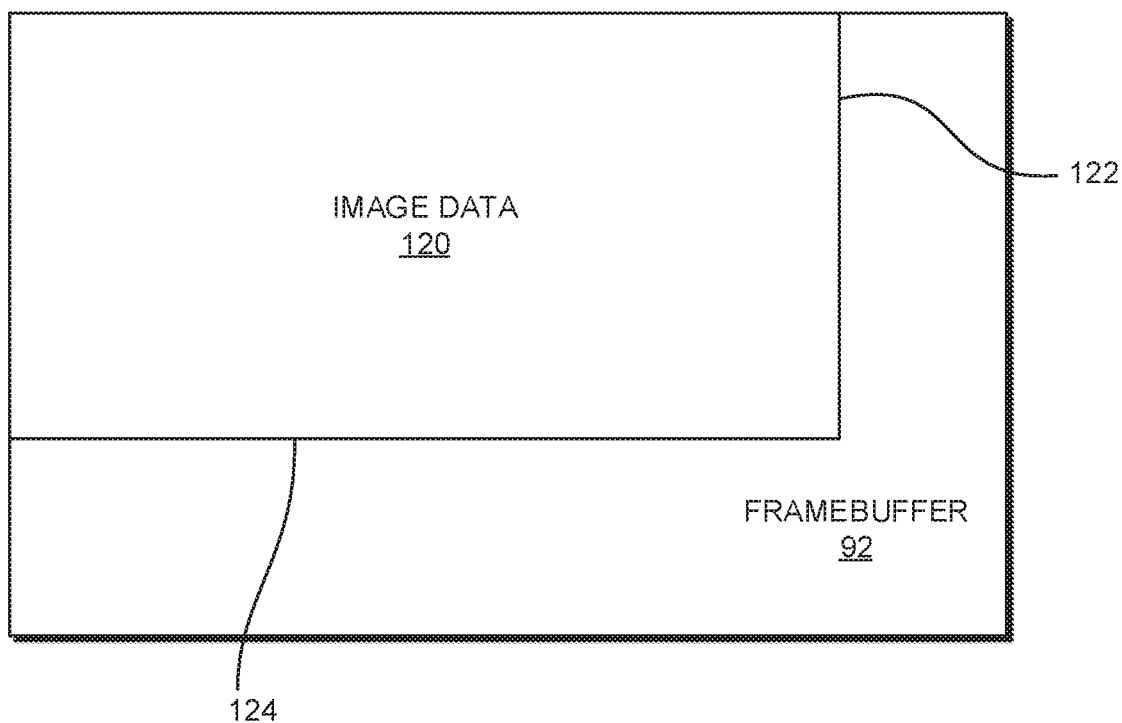
FIG. 6 is an example representation of framebuffer data.

FIG. 6 shows an example representation of framebuffer content. The framebuffer 92 may be larger than actual image data 120 stored if, for example, the resolution of the image data 120 is lower than the size of the framebuffer 92. In other words, the framebuffer 92 may contain an off-screen region. As such, the instructions 100 may include edge detection instructions to detect an edge 122, 124 of the image data 120 and to infer from the edge 122, 124 a display parameter, such as resolution, of the image data 120. The instructions 100 may reference expected aspect ratios, such as 4:3, 16:9, 16:10, and similar, which may make the edge detection process more efficient.

For example, if the instructions 100 determine that a resolution is 1920 by 1080 pixels. Accordingly, the instructions 100 may write display data 108 at a location in the framebuffer 92 that corresponds to a window that fills horizontal pixels 760 to 1160 and vertical pixels 440 to 640. In another example, the instructions 100 may determine that a color depth is 24 bits. Accordingly, the instructions may write display data 108 to the framebuffer 92 according to a 24-bit format. This may ensure that the human-perceptible message is outputted in a way that is visible to the user.

The instructions 100 may output the human-perceptible message without first confirming that the predetermined state of the operating system 30 has been entered. That is, after the instructions 100 generate the keyboard code, it may be assumed that the predetermined state has been entered. In some examples, the instructions 100 may wait for a time to elapse to confirm that the predetermined state has been entered. Examples times include 100 milliseconds, 500 milliseconds, 1 second, and similar.

In other examples, the instructions 100 may analyze data in the framebuffer 92 to confirm that the predetermined state has actually been entered. This may be achieved by detecting a change in a display parameter or by testing for predetermined content, such as a predetermined image or color. The SMM and an SMI may be used to obtain data from the framebuffer 92 for this purpose.

Regarding detecting a change in a display parameter, the instructions 100 may determine one or more display parameters, as discussed elsewhere herein, regularly, periodically, or at different times. If a display parameter changes within a time of the instructions 100 outputting the keyboard code, then the instructions 100 may take the change of display parameter as confirmation that the operating system 30 has entered the predetermined state, such as the lock screen. The specific time may be selected with reference to expected behavior of the computer system. For example, if the resolution changes within 50 milliseconds of the instructions 100 outputting the keyboard code, then the instructions 100 may take this as confirmation that the human-perceptible message may now be reliably displayed.

Regarding testing for predetermined content, the instructions 100 may search the framebuffer 92 for one or more predetermined images that may be stored in the firmware 14 as reference images in data 102. A predetermined image may be associated with a location where it is expected to be displayed, so that the instructions 100 may only need to search a portion of the framebuffer 92. If a predetermined image is found in the framebuffer 92, the instructions 100 may take that to be confirmation that the operating system 30 has entered the predetermined state, such as the lock screen. Examples of predetermined content includes, numbers, letters, icons, symbols, blocks of pixels of particular color, and similar. For example, a lock screen may display a current time at a predetermined location, as shown in FIG. 10. As such, predetermined images may include image of the numbers 0-9, a colon, and the letters A, P, and M, for example. Detection of a number of these images may confirm that the lock screen is being displayed. In another example, a lock screen may display a particular region as a particular color. As such, predetermined content may include one or more pixels of that color to be used to confirm that the lock screen is being displayed.

Figure 7:
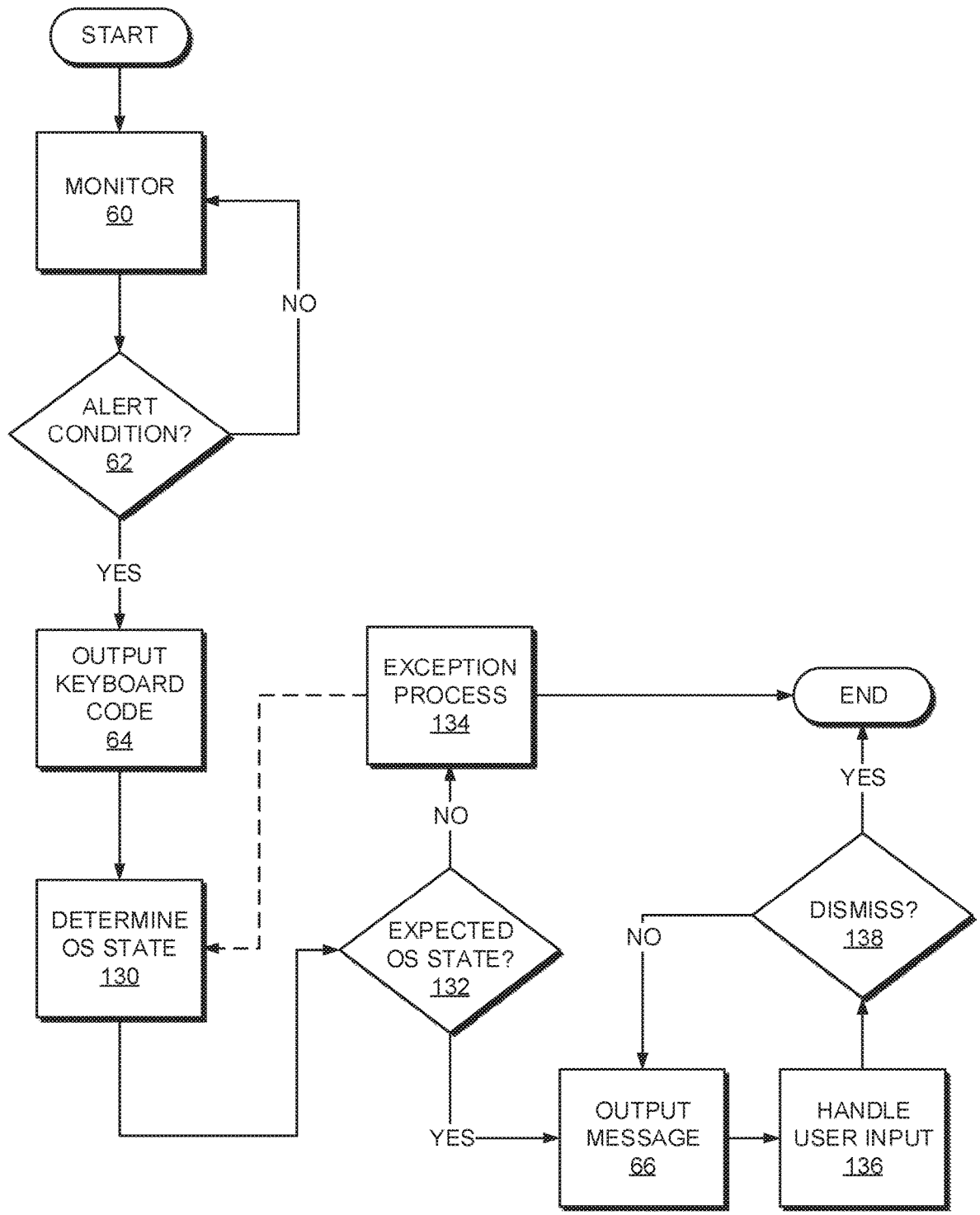
FIG. 7 is a flowchart of an example method of using firmware to display a human-perceptible message with confirmation of operating system state.

FIG. 7 shows an example method of using firmware to display a human-perceptible message with confirmation of an operating system state. The method may be realized with the set of instructions 100, for example.

A state of a computer system may be monitored, at block 60, during runtime of the operating system. Monitored state may be compared to state conformance data, at block 62. Upon detecting an alert condition, the firmware may output a keyboard code, at block 64. Further discussion elsewhere herein concerning blocks 60-64 may be referenced.

After the keyboard code has been outputted, the state of the operating system may be confirmed, at block 130. Confirming operating system state may include analyzing framebuffer data for information indicative of a predetermined expected state. Such data may include an image, pixel color, an edge between on-screen and off-screen data, and similar. A change in a display parameter, which may be discernable from a framebuffer, may indicate that the operating system has entered the expected state. Confirming operating system state may include waiting a time. The expected operating system state may be an alert presentation state in which an alert may be reliable presented by the firmware. This may be a state having one or more display parameters that are knowable or identifiable by the firmware.

An SMI that triggers the SMM may be used to obtain data from the framebuffer, at block 130. An SMI may be repeatedly or periodically triggered to obtain data from the framebuffer to confirm the operating system has entered the expected state.

If it is determined that the operating system has not entered the expected state, at block 132, then an exception process may be performed, at block 134. The exception process may include returning to a previous block of the method, such as block 60, to perform the method a number of times. The exception process may include returning to block 64 to output a different keyboard code, in case the operating system may have failed to recognize the previously outputted keyboard code. The exception process may log an error.

A loop between block 134 and block 130, via block 132, may represent the firmware continually monitoring the operating system for the expected state. This may be realized by triggering an SMI that initiates the SMM, at block 130, to obtain and analyze data from the framebuffer. An SMI may be retriggered at each instance of determining the operating system state, that is, at each execution of block 130. A timeout or loop counter may be used to stop monitoring the operating system for the expected state to guard against an endless loop.

If it is determined that the operating system has entered the expected state, at block 132, the firmware outputs a human-perceptible message to a display device, at block 66. This may include the firmware obtaining one or more display parameters, which may include referencing any display parameter that was determined at block 130 to confirm the operating system state. The firmware may output the human-perceptible message in accordance with the one or more display parameters. That is, the firmware may write a human-perceptible message using an appropriate framebuffer base address, resolution, scan line length, and color depth.

At block 136, user input may be handled. This may include monitoring for the press of a key on a keyboard, the press of a power button of the computer system, or similar.

If user input is determined to dismiss the human-perceptible message, at block 138, then the method ends.

A loop between block 136 and block 66, via block 138, may represent the firmware continually monitoring for user input. This may be realized by triggering an SMI that initiates the SMM, at block 66, to output the human-perceptible message and to handle user input, at block 136. An SMI may be retriggered to avoid causing a problem with the operating system. An SMI may be retriggered at each execution of block 66.

Figure 8:
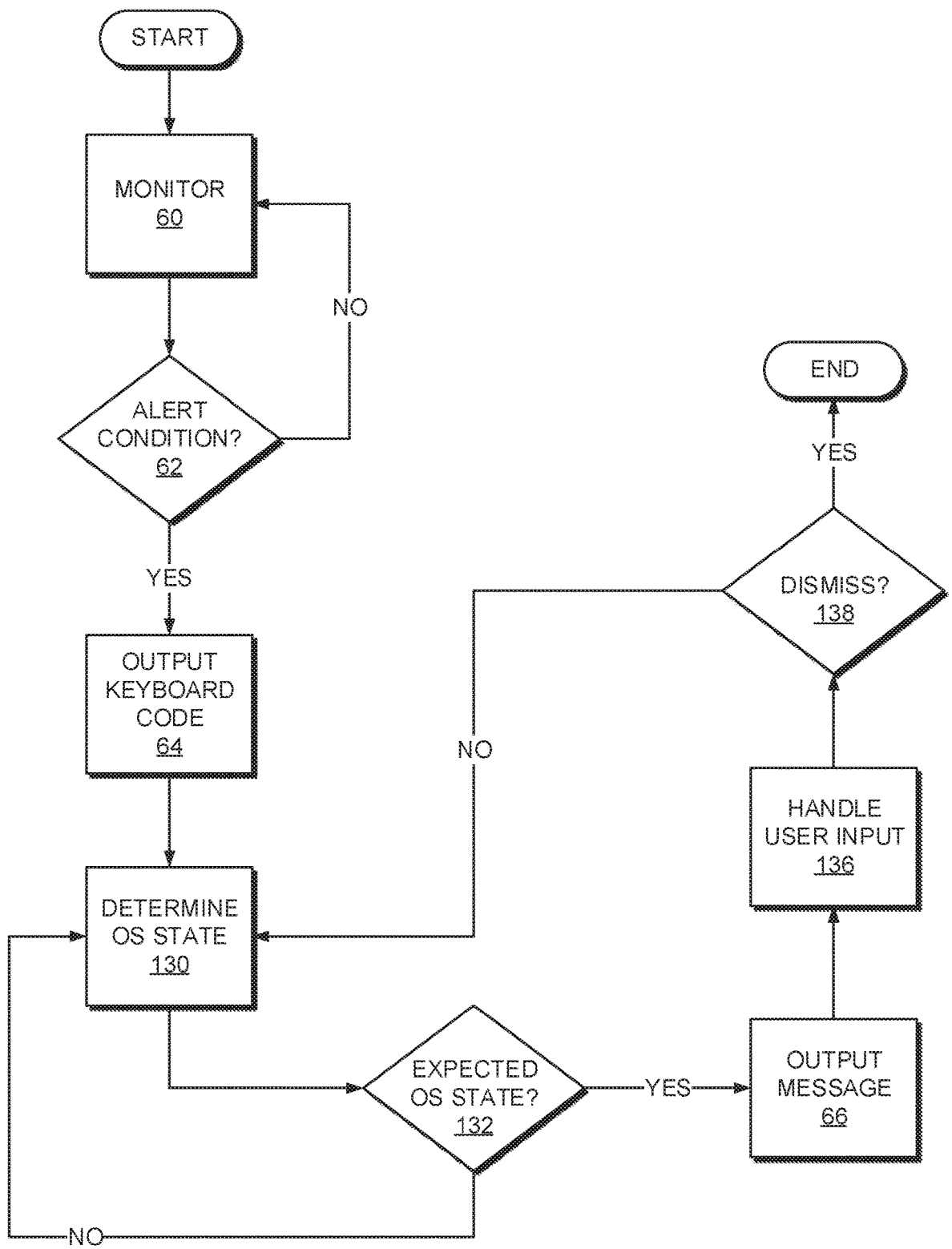
FIG. 8 is a flowchart of another example method of using firmware to display a human-perceptible message with confirmation of operating system state.

FIG. 8 shows another example method of using firmware to display a human-perceptible message with confirmation of an operating system state. The method may be realized with the set of instructions 100, for example.

The description elsewhere herein for the blocks 60-66 and 130-138 may be referenced. The expected operating system state may be checked via a loop between blocks 130 and 132. When the user does not dismiss the human-perceptible message, at block 138, the method returns to determining the expected operating system state, at block 130.

The determination of operating system state at blocks 130 and 132, the outputting of the human-perceptible message at block 66, and the handling of user input at blocks 136 and 138 may be performed by triggering an SMI to enter the SMM. The SMI may be triggered at, for example, block 130. The SMI may be retriggered regularly or periodically, for example at each execution of block 130, to avoid causing a problem with the functioning of the operating system.

Figure 9:
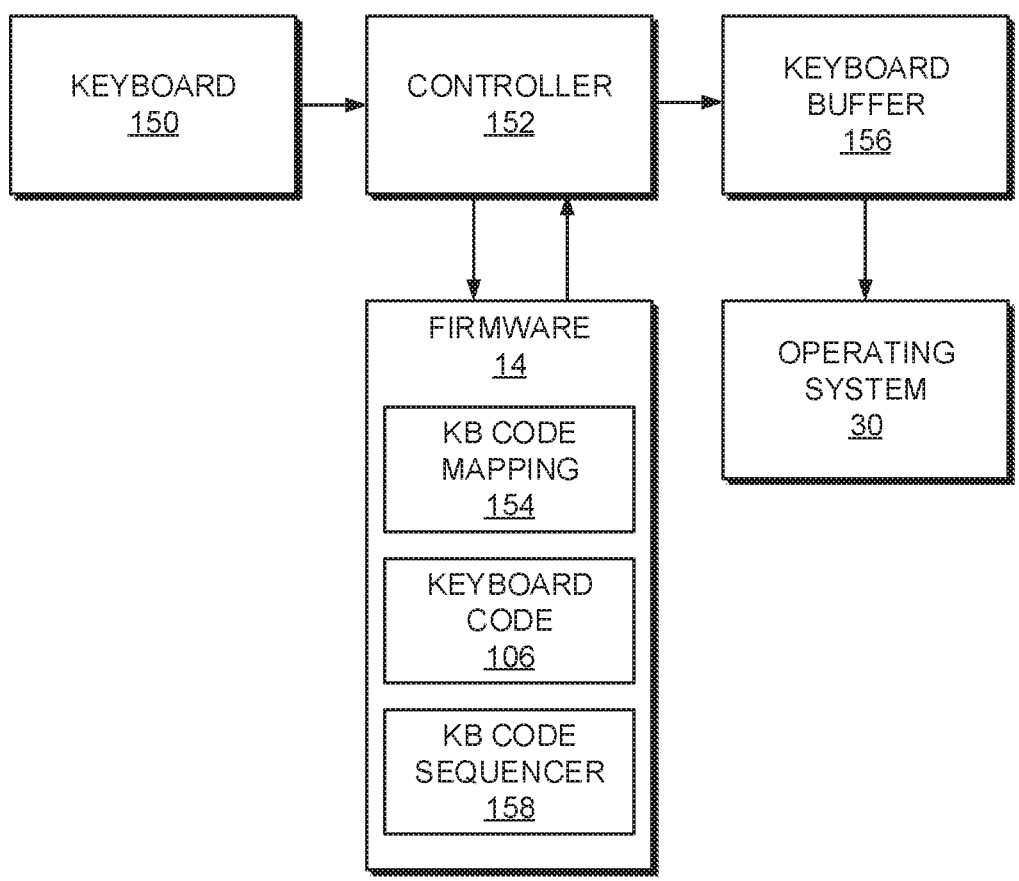
FIG. 9 is a block diagram of an example keyboard subsystem.

FIG. 9 shows an example keyboard subsystem of a computer system, such as a computer system discussed elsewhere herein.

A keyboard 150 may be coupled to a keyboard controller 152. The keyboard 150 may be a PS/2 keyboard, a USB keyboard, a laptop computer's integrated keyboard, or similar. More than one keyboard may be connected to the same or multiple keyboard controllers 152.

The keyboard controller 152 may be a peripheral controller 88 or USB controller 90, as discussed elsewhere herein, or similar. The keyboard controller 152 may provide a keyboard code generated by the keyboard 150 to the firmware 14. The firmware 14 may include a keyboard code mapping 154 that correlates keyboard codes that may be received from the keyboard controller 152 to keyboard codes that are understood by the operating system 30. The keyboard code mapping 154 may translate keyboard codes generated by the keyboard 150 into keyboard codes consumed by the operating system 30.

The keyboard buffer 156 may be a region of RAM or other memory that stores a queue of keyboard codes. The operating system 30 may take keyboard codes from the keyboard buffer 156.

When the firmware 14 is to output the keyboard code 106 that triggers the operating system 30 to enter the predetermined state, such as a lock screen, the firmware 14 may reference a keyboard code sequencer 158.

The keyboard code sequencer 158 may include instructions to insert the keyboard code 106 into the buffer 156 to maintain integrity of any other keyboard codes in the buffer 156. That is, one or more keyboards 150 and one or more keyboard controllers 152 may generate keyboard codes that are to be stored in the keyboard buffer 156. Some of these the keyboard codes may be multi-code sequences that corresponding to certain characters or actions at the operating system 30. The keyboard code sequencer 158 may maintain the integrity of the multi-code sequences when inserting the lock screen triggering keyboard code 106 into the buffer 156 among the multi-code sequences. When the lock screen triggering keyboard code 106 includes multiple sequential keyboard codes, such as those shown in FIGS. 2 and 3, the keyboard code sequencer 158 may also maintain the integrity of the multi-code lock screen triggering keyboard code 106 when inserting the keyboard code 106 into the buffer 156 among other keyboard codes. Maintaining the integrity of a multi-code keyboard code may include enforcing adjacency of keyboard codes of a sequence. This may require delaying output of the lock screen triggering keyboard code 106 until another sequence of keyboard codes is completely inserted into the buffer 156.

When the controller 152 is a USB controller, other devices, such as a mouse, may be connected to the controller 152. Accordingly, the keyboard code sequencer 158 may include instructions to maintain integrity of mouse input codes.

FIG. 10 shows an example lock screen 200 displaying an example human-perceptible message 202. The lock screen 200 may include a time display 204, which may be matched to predetermined content to confirm that the lock screen 200 is being displayed.

The human-perceptible message 202 may include an indication 206 of the non-conforming state, an alert message, or similar. The human-perceptible message 202 may include an indication 208 of a dismiss action that may be performed by the user to dismiss the human-perceptible message 202. Indications 206, 208 may include text, icons, or similar.

Using a computer system's firmware to output a keyboard code that triggers a predetermined state in an operating system may provide a knowable or identifiable set of display parameters that may be used to alert the user of a non-conforming or erroneous state in the computer system. The firmware may be able to reliably output a message to the user during runtime, regardless of the specific display configuration of the computer system and any applications that may be in use when the message is to be provided to the user.

It should be recognized that features and aspects of the various examples provided above can be combined into further examples that also fall within the scope of the present disclosure.

The invention claimed is:

1. A computer system comprising:
a processor;

firmware to provide boot and runtime services to an operating system executable by the processor, the operating system responsive to a keyboard code to enter a predetermined state, the firmware having a set of instructions to:
- monitor for a non-conforming state of the computer system;
- upon detecting the non-conforming state, output the keyboard code to cause the operating system to enter the predetermined state; and
- display the predetermined state including a human-perceptible message with a display device after outputting the keyboard code, wherein the predetermined state is displayed using a display parameter stored in the firmware as correlated to a plurality of display devices including the display device and identifiable to the firmware, wherein the display parameter is applied to display the human-perceptible message.

2. The system of claim 1, wherein the predetermined state comprises a lock screen.

3. The system of claim 1, wherein the set of instructions is to output the human-perceptible message to a framebuffer coupled to the display device.

4. The system of claim 3, wherein the set of instructions is to analyze data in the framebuffer to confirm that the predetermined state is entered.

5. The system of claim 4, wherein the set of instructions is to analyze the data in the framebuffer to test predetermined content.

6. The system of claim 4, wherein the set of instructions is to analyze the data in the framebuffer to detect a change to a display parameter.

7. The system of claim 1, wherein the display parameter is stored in the firmware.

8. The system of claim 1, wherein the set of instructions is to analyze data in a framebuffer to obtain the display parameter.

9. The system of claim 1, wherein the set of instructions is to wait for a time to elapse to confirm that the predetermined state has been entered.

10. The system of claim 1, wherein the set of instructions is to output a plurality of sequential keyboard codes to cause the operating system to enter the predetermined state, and the set of instructions is to insert the plurality of sequential keyboard codes into a buffer to maintain integrity of the sequential keyboard codes and of any other keyboard codes in the buffer.

11. A non-transitory machine-readable storage medium encoded with instructions executable by a processor of a computer system, the non-transitory machine-readable storage medium comprising:
- firmware to provide boot and runtime services to an operating system executable by the processor, the operating system responsive to a keyboard code to enter a predetermined state, the firmware having:
  - instructions to monitor for a non-conforming state of the computer system;
  - instructions to output the keyboard code upon detecting the non-conforming state to cause the operating system to enter the predetermined state; and
  - instructions to display a human-perceptible message for a predetermined state with a display device after outputting the keyboard code, wherein the predetermined state is displayed using a display parameter stored in the firmware as correlated to a plurality of display devices including the display device and identifiable to the firmware wherein the display parameters is applied to display the human-perceptible message.

12. A method comprising:
- monitoring for an alert condition of a computer system, the computer system having firmware to provide boot and runtime services to an operating system executable by the computer system;
- upon detecting the alert condition, using the firmware to output a keyboard code to cause the operating system to enter an alert presentation state; and
- displaying a human-perceptible message of the alert presentation state with a display device after outputting the keyboard code, wherein the alert presentation state is displayed using a display parameter stored in the firmware as correlated to a plurality of display devices including the display device and identifiable to the firmware, wherein the display parameter is applied to display the human-perceptible message.

* * * * *